US012801986B2

(12) United States Patent
Conte et al.

(10) Patent No.: US 12,801,986 B2
(45) Date of Patent: Nov. 17, 2026

(54) FRAMEWORK FOR A MACHINE LEARNING MODEL AND/OR MACHINE LEARNING APPLICATION ADAPTATION FOR A TARGET IN A COMMUNICATIONS NETWORK

(71) Applicant: NOKIA TECHNOLOGIES OY, Espoo (FI)

(72) Inventors: Alberto Conte, L'Hay les Roses (FR); Abdelrahman Abdelkader, Munich (DE); Abdelkrim Hebbar, Orsay (FR)

(73) Assignee: Nokia Technologies Oy, Espoo (FI)

( * ) Notice: Subject to any disclaimer, the term of this patent is extended or adjusted under 35 U.S.C. 154(b) by 767 days.

(21) Appl. No.: 18/147,230

(22) Filed: Dec. 28, 2022

(65) Prior Publication Data

US 2024/0256949 A1 Aug. 1, 2024

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

2019/0182114 A1* 6/2019 Tavridis .................. H04L 41/16
2020/0285891 A1* 9/2020 Yellin ...................... H04L 67/34
2021/0097428 A1* 4/2021 Kozhaya ............... G06F 18/232
2021/0125066 A1 4/2021 Lazovich

FOREIGN PATENT DOCUMENTS

WO WO 2022/000802 A1 1/2022
WO WO 2022/218519 A1 10/2022

OTHER PUBLICATIONS

Extended European Search Report for European Application No. 23204230.9 dated Mar. 28, 2024, 10 pages.
Warden et al., "TinyML—Machine Learning with TensorFlow Lite on Arduino and Ultra-Low-Power Microcontrollers", Preview of First Six Chapters, O'Reilly, (Dec. 2019), 149 pages.

(Continued)

*Primary Examiner* — Pei Yong Weng
(74) *Attorney, Agent, or Firm* — Barta Jones, PLLC

(57) ABSTRACT

Methods, systems, apparatuses, and computer program products are provided for machine learning model and/or machine learning application adaptation for a target in a communications network. In this regard, a machine learning request for a machine learning model related to a target is received from a consumer entity. The machine learning request includes a machine learning identifier to identify the machine learning model, a target identifier to identify the target, and a consumer entity identifier to identify the consumer entity. Additionally, a machine learning adaptation profile is obtained based at least in part on information or data retrieved from the machine learning identifier, the target identifier, and the consumer entity identifier. The machine learning model is adapted based at least in part on the machine learning adaptation profile to generate a deployable version of the machine learning model. A deployable version of the machine learning model may then be provided to the target.

20 Claims, 8 Drawing Sheets

(56) References Cited

OTHER PUBLICATIONS

"Create Production-Grade Machine Learning Models with TensorFlow", Retrieved via the Wayback Machine on Sep. 12, 2023, <URL:https://web.archive.org/web/20221225145618/www.tensorflow.org/>, (Dec. 25, 2022), 13 pages.
"Deploy Machine Learning Models on Mobile and Edge Devices", Retrieved via the Wayback Machine on Sep. 12, 2023, <URL:https://web.archive.org/web/20221210061232/https://www.tensorflow.org/lite/>, (Dec. 10, 2022), 6 pages.
"PyTorch Mobile", Retrieved via the Wayback Machine on Sep. 12, 2023, <URL:https://web.archive.org/web/20221211163203/https://pytorch.org/mobile/home/>, (Dec. 11, 2022).
Doyu et al., "How Can We Democratize Machine Learning on IoT Devices?", Retrieved via the Internet on Sep. 12, 2023, <URL:https://www.ericsson.com/en/blog/2020/2/how-can-we-democratize-machine-learning-iot-devices>, (Feb. 12, 2020), 13 pages.
Hinton et al., "Distilling the Knowledge in a Neural Network." arXiv preprint arXiv:1503.02531v1 (Mar. 9, 2015), 9 pages.
Zhou et al., "Adaptive Quantization for Deep Neural Network", arXiv:1712.01048v1, (Dec. 4, 2017), 14 pages.

* cited by examiner

FRAMEWORK FOR A MACHINE LEARNING MODEL AND/OR MACHINE LEARNING APPLICATION ADAPTATION FOR A TARGET IN A COMMUNICATIONS NETWORK

TECHNOLOGICAL FIELD

An example embodiment of the present disclosure generally relates to communication systems and, more particularly, to machine learning architectures and/or procedures for a communications network.

BACKGROUND

A communication system can be seen as a facility that enables communication sessions between two or more entities such as user equipment (UE), base stations/access points, Network Functions (NF), and/or other nodes by providing connectivity between the various entities involved in the communication path. A communication system can be provided, for example, with a communication network and one or more compatible communication devices. Communication systems continue to evolve to extend the flexibility in the network usage, to provide improved security, and/or to provide users with improved network services. For instance, fourth generation (4G) wireless mobile telecommunications technology, also known as Long Term Evolution (LTE) technology, was designed to provide high-capacity mobile multimedia with high data rates particularly for human interaction. Next generation or fifth generation (5G) technology is intended to be used not only for human interaction, but also for machine type communications in so-called Internet of Things (IoT) networks.

Third generation partnership project (3GPP) has developed standards for 5G technology, including standards for next generation radio access networks and 5G network architectures that can deliver extreme broadband and ultra-robust, low latency connectivity. 5G technology improves a variety of telecommunication services offered to the end users and helps to support massive broadband that delivers gigabytes of bandwidth per second on demand for both the uplink and downlink transmissions. Additionally, the 5G network has been designed as a Service Based Architecture (SBA), e.g., a system architecture in which the system functionality is achieved by a set of NFs providing services to other authorized NFs to access their services. To facilitate a communication session, machine learning modeling services can be provided via a communication system. However, machine learning modeling services can often be inefficient and/or may result in data consumers receiving an incorrect version of a machine learning model, among other deficiencies.

BRIEF SUMMARY

Methods, apparatuses and computer program products are provided in accordance with example embodiments to provide a machine learning model and/or application adaptation for a target in a communications network.

In an example embodiment, a method is provided. The method includes receiving, from a consumer entity, a machine learning request for a machine learning model related to a target, the machine learning request comprising a machine learning identifier to identify the machine learning model, a target identifier to identify the target, and a consumer entity identifier to identify the consumer entity. In one or more embodiments, the method also includes obtaining a machine learning adaptation profile based at least in part on information or data retrieved from the machine learning identifier, the target identifier, and the consumer entity identifier. In one or more embodiments, the method also includes adapting the machine learning model based at least in part on the machine learning adaptation profile to generate a deployable version of the machine learning model. In one or more embodiments, the method also includes causing the deployable version of the machine learning model to be provided to the target.

In one or more embodiments, the adapting the machine learning model includes retraining the machine learning model based at least in part on the target identifier and the consumer entity identifier. In one or more embodiments, the adapting the machine learning model additionally or alternatively includes validating the machine learning model based at least in part on the target identifier and the consumer entity identifier. In one or more embodiments, the adapting the machine learning model additionally or alternatively includes adapting the machine learning model based at least in part on a set of software attributes associated with the target identifier. In one or more embodiments, the adapting the machine learning model additionally or alternatively includes adapting the machine learning model based at least in part on a set of compiler policies for the target identifier. In one or more embodiments, the adapting the machine learning model additionally or alternatively includes authorizing the deployable version of the machine learning model based on the consumer entity identifier.

In one or more embodiments, the method additionally or alternatively includes causing transmission of an acknowledgment message to the consumer entity in response to an acknowledgment of an execution of the deployable version of the machine learning model via the target.

In one or more embodiments, the method additionally or alternatively includes configuring the machine learning adaptation profile based at least in part on a registration request provided by a target provider.

In one or more embodiments, the method additionally or alternatively includes receiving the machine learning adaptation profile via a registration request provided by a target provider. In one or more embodiments, the adapting the machine learning model additionally or alternatively includes adapting the machine learning model based at least in part on the machine learning adaptation profile provided by the target provider.

In another example embodiment, an apparatus includes at least one processor and at least one memory storing instructions that, when executed by the at least one processor, cause the apparatus at least to receive, from a consumer entity, a machine learning request for a machine learning model related to a target, the machine learning request comprising a machine learning identifier to identify the machine learning model, a target identifier to identify the target, and a consumer entity identifier to identify the consumer entity. In one or more embodiments, the instructions further cause, when executed by the at least one processor, the apparatus to obtain a machine learning adaptation profile based at least in part on information or data retrieved from the machine learning identifier, the target identifier, and the consumer entity identifier. In one or more embodiments, the instructions further cause, when executed by the at least one processor, the apparatus to adapt the machine learning model based at least in part on the machine learning adaptation profile to generate a deployable version of the machine learning model. In one or more embodiments, the instructions further cause, when executed by the at least one processor, the apparatus to cause the deployable version of the machine learning model to be provided to the target.

In one or more embodiments, the instructions cause, when executed by the at least one processor, the apparatus to retrain the machine learning model based at least in part on the target identifier and the consumer entity identifier. In one or more embodiments, the instructions additionally or alternatively cause, when executed by the at least one processor, the apparatus to validate the machine learning model based at least in part on the target identifier and the consumer entity identifier. In one or more embodiments, the instructions additionally or alternatively cause, when executed by the at least one processor, the apparatus to adapt the machine learning model based at least in part on a set of hardware attributes associated with the target identifier. In one or more embodiments, the instructions additionally or alternatively cause, when executed by the at least one processor, the apparatus to adapt the machine learning model based at least in part on a set of software attributes associated with the target identifier. In one or more embodiments, the instructions additionally or alternatively cause, when executed by the at least one processor, the apparatus to adapt the machine learning model based at least in part on a set of compiler policies for the target identifier.

In one or more embodiments, the instructions additionally or alternatively cause, when executed by the at least one processor, the apparatus to authorize the deployable version of the machine learning model based on the consumer entity identifier.

In one or more embodiments, the instructions additionally or alternatively cause, when executed by the at least one processor, the apparatus to cause transmission of an acknowledgment message to the consumer entity in response to an acknowledgment of an execution of the deployable version of the machine learning model via the target.

In one or more embodiments, the instructions additionally or alternatively cause, when executed by the at least one processor, the apparatus to configure the machine learning adaptation profile based at least in part on a registration request provided by a target provider.

In one or more embodiments, the instructions additionally or alternatively cause, when executed by the at least one processor, the apparatus to receive the machine learning adaptation profile via a registration request provided by a target provider. In one or more embodiments, the instructions additionally or alternatively cause, when executed by the at least one processor, the apparatus to adapt the machine learning model based at least in part on the machine learning adaptation profile provided by the target provider.

In another example embodiment, a computer program product is provided. The computer program product includes at least one non-transitory computer readable storage medium having computer-executable program code instructions stored therein with the computer-executable program code instructions including program code instructions configured, upon execution, to receive, from a consumer entity, a machine learning request for a machine learning model related to a target, the machine learning request comprising a machine learning identifier to identify the machine learning model, a target identifier to identify the target, and a consumer entity identifier to identify the consumer entity.

In one or more embodiments, the computer-executable program code instructions are also configured to obtain a machine learning adaptation profile based at least in part on information or data retrieved from the machine learning identifier, the target identifier, and the consumer entity identifier. In one or more embodiments, the computer-executable program code instructions are also configured to adapt the machine learning model based at least in part on the machine learning adaptation profile to generate a deployable version of the machine learning model. In one or more embodiments, the computer-executable program code instructions are also configured to cause the deployable version of the machine learning model to be provided to the target.

In one or more embodiments, the computer-executable program code instructions are configured to retrain the machine learning model based at least in part on the target identifier and the consumer entity identifier. In one or more embodiments, the computer-executable program code instructions are additionally or alternatively configured to validate the machine learning model based at least in part on the target identifier and the consumer entity identifier. In one or more embodiments, the computer-executable program code instructions are additionally or alternatively configured to adapt the machine learning model based at least in part on a set of hardware attributes associated with the target identifier. In one or more embodiments, the computer-executable program code instructions are additionally or alternatively configured to adapt the machine learning model based at least in part on a set of software attributes associated with the target identifier. In one or more embodiments, the computer-executable program code instructions are additionally or alternatively configured to adapt the machine learning model based at least in part on a set of compiler policies for the target identifier.

In one or more embodiments, the computer-executable program code instructions are additionally or alternatively configured to authorize the deployable version of the machine learning model based on the consumer entity identifier.

In one or more embodiments, the computer-executable program code instructions are additionally or alternatively configured to cause transmission of an acknowledgment message to the consumer entity in response to an acknowledgment of an execution of the deployable version of the machine learning model via the target.

In one or more embodiments, the computer-executable program code instructions are additionally or alternatively configured to configure the machine learning adaptation profile based at least in part on a registration request provided by a target provider.

In one or more embodiments, the computer-executable program code instructions are additionally or alternatively configured to receive the machine learning adaptation profile via a registration request provided by a target provider. In one or more embodiments, the computer-executable program code instructions are additionally or alternatively configured to adapt the machine learning model based at least in part on the machine learning adaptation profile provided by the target provider.

In yet another example embodiment, an apparatus is provided that includes means for receiving, from a consumer entity, a machine learning request for a machine learning model related to a target, the machine learning request comprising a machine learning identifier to identify the machine learning model, a target identifier to identify the target, and a consumer entity identifier to identify the consumer entity. In one or more embodiments, the apparatus of this example embodiment also includes means for obtaining a machine learning adaptation profile based at least in part on information or data retrieved from the machine learning identifier, the target identifier, and the consumer entity identifier. In one or more embodiments, the apparatus of this example embodiment also includes means for adapting the machine learning model based at least in part on the machine learning adaptation profile to generate a deployable version of the machine learning model. In one or more embodiments, the apparatus of this example embodiment also includes means for causing the deployable version of the machine learning model to be provided to the target.

In one or more embodiments, the adapting the machine learning model includes means for retraining the machine learning model based at least in part on the target identifier and the consumer entity identifier. In one or more embodiments, the adapting the machine learning model additionally or alternatively includes means for validating the machine learning model based at least in part on the target identifier and the consumer entity identifier. In one or more embodiments, the adapting the machine learning model additionally or alternatively includes means for adapting the machine learning model based at least in part on a set of software attributes associated with the target identifier. In one or more embodiments, the adapting the machine learning model additionally or alternatively includes means for adapting the machine learning model based at least in part on a set of compiler policies for the target identifier. In one or more embodiments, the adapting the machine learning model additionally or alternatively includes means for authorizing the deployable version of the machine learning model based on the consumer entity identifier.

In one or more embodiments, the apparatus of this example embodiment additionally or alternatively includes means for causing transmission of an acknowledgment message to the consumer entity in response to an acknowledgment of an execution of the deployable version of the machine learning model via the target.

In one or more embodiments, the apparatus of this example embodiment additionally or alternatively includes means for configuring the machine learning adaptation profile based at least in part on a registration request provided by a target provider.

In one or more embodiments, the apparatus of this example embodiment additionally or alternatively includes means for receiving the machine learning adaptation profile via a registration request provided by a target provider. In one or more embodiments, the adapting the machine learning model additionally or alternatively includes means for adapting the machine learning model based at least in part on the machine learning adaptation profile provided by the target provider.

BRIEF DESCRIPTION OF THE DRAWINGS

Figure 1:
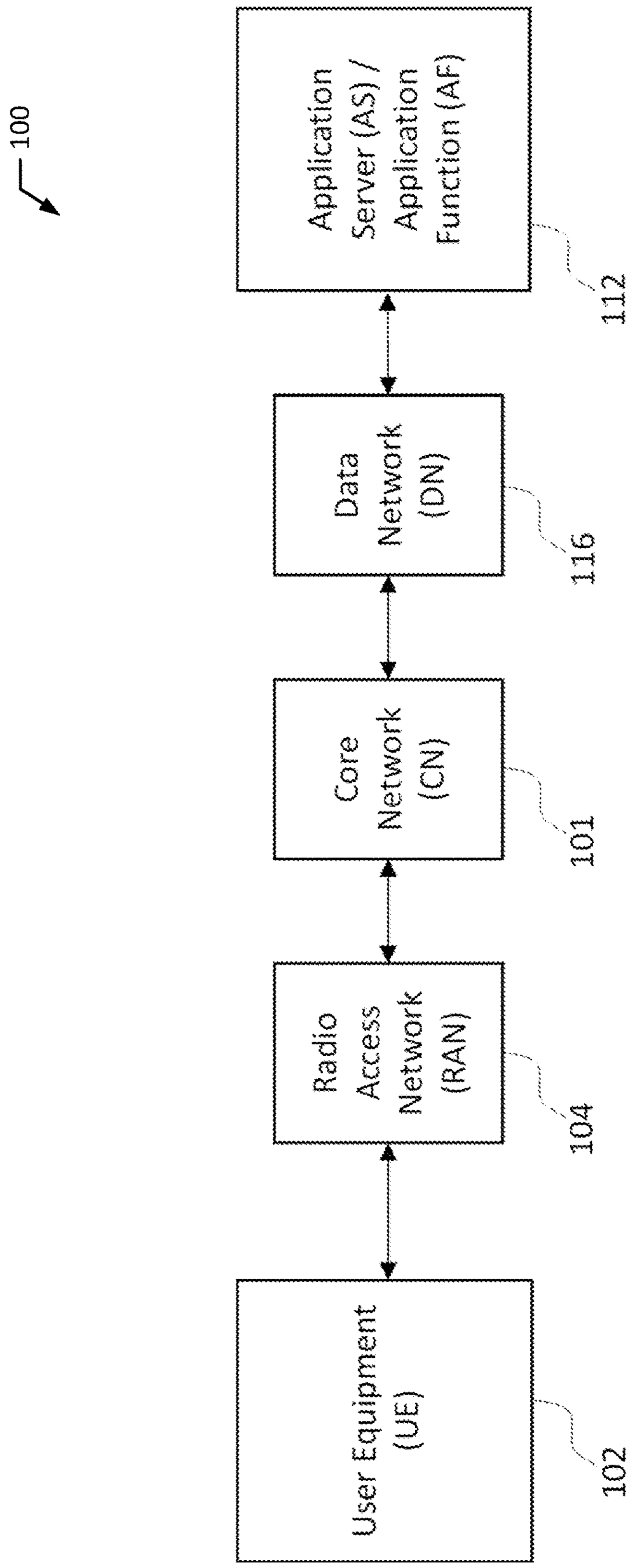
Figure 2:
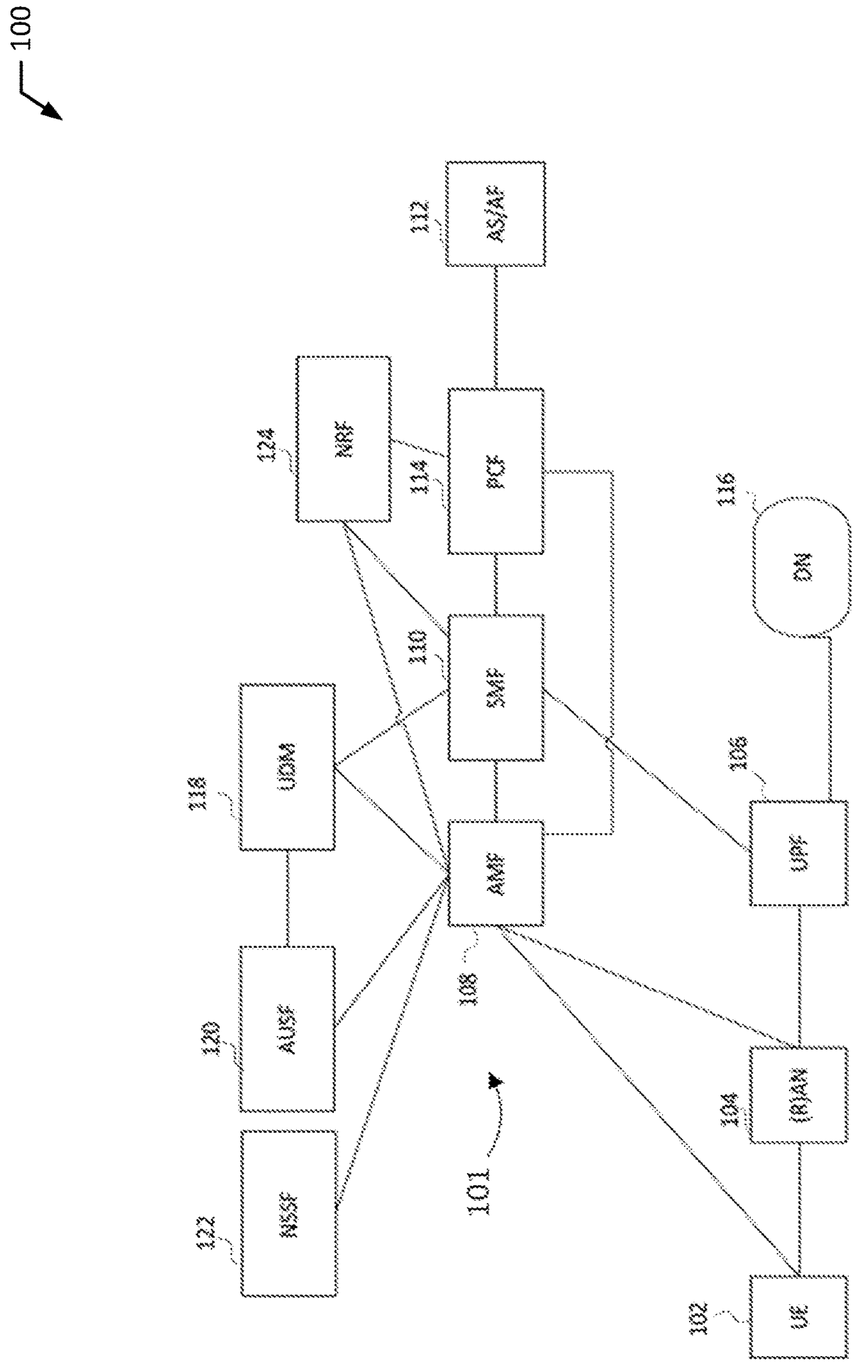
Figure 3:
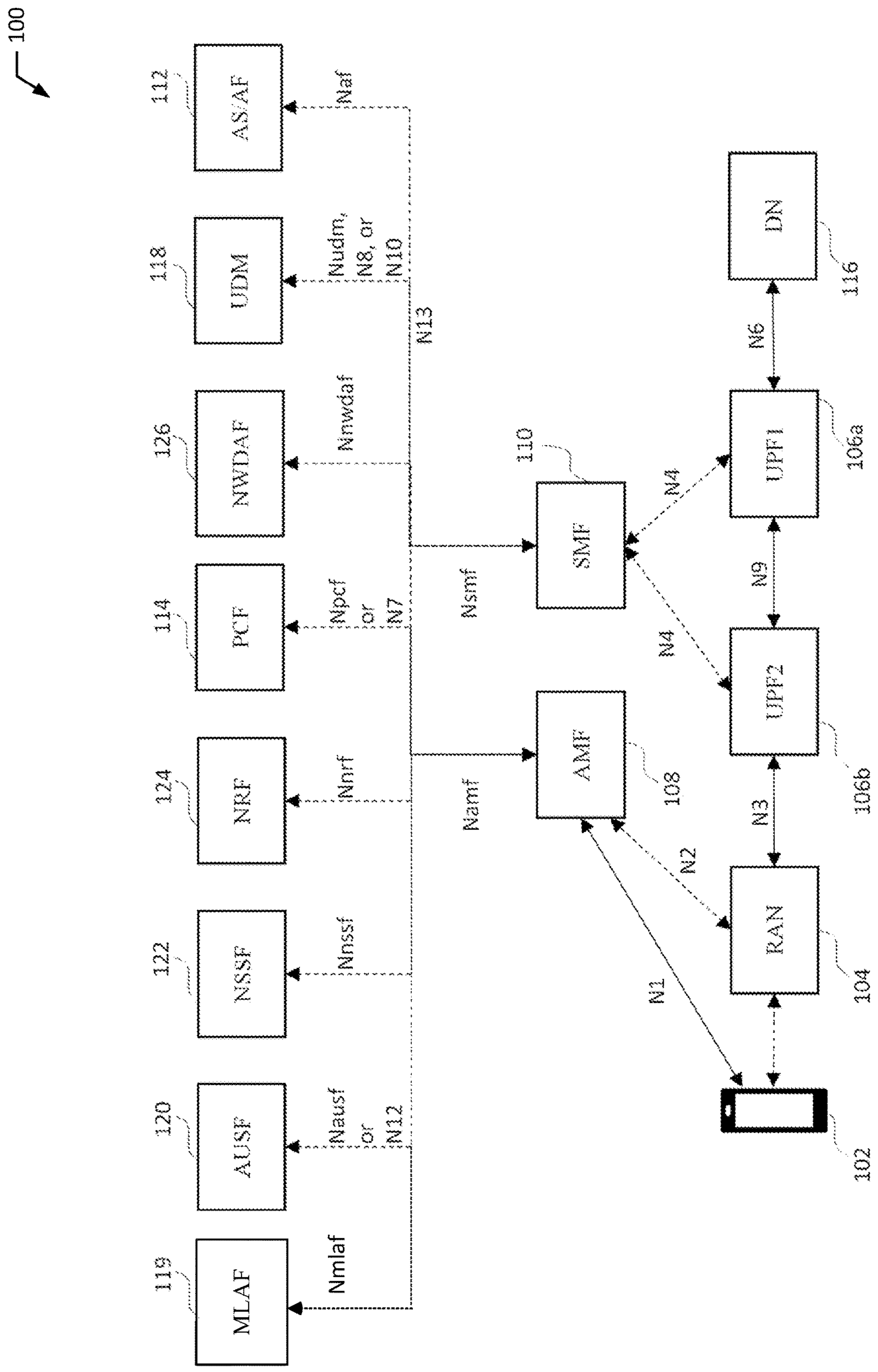
Figure 4:
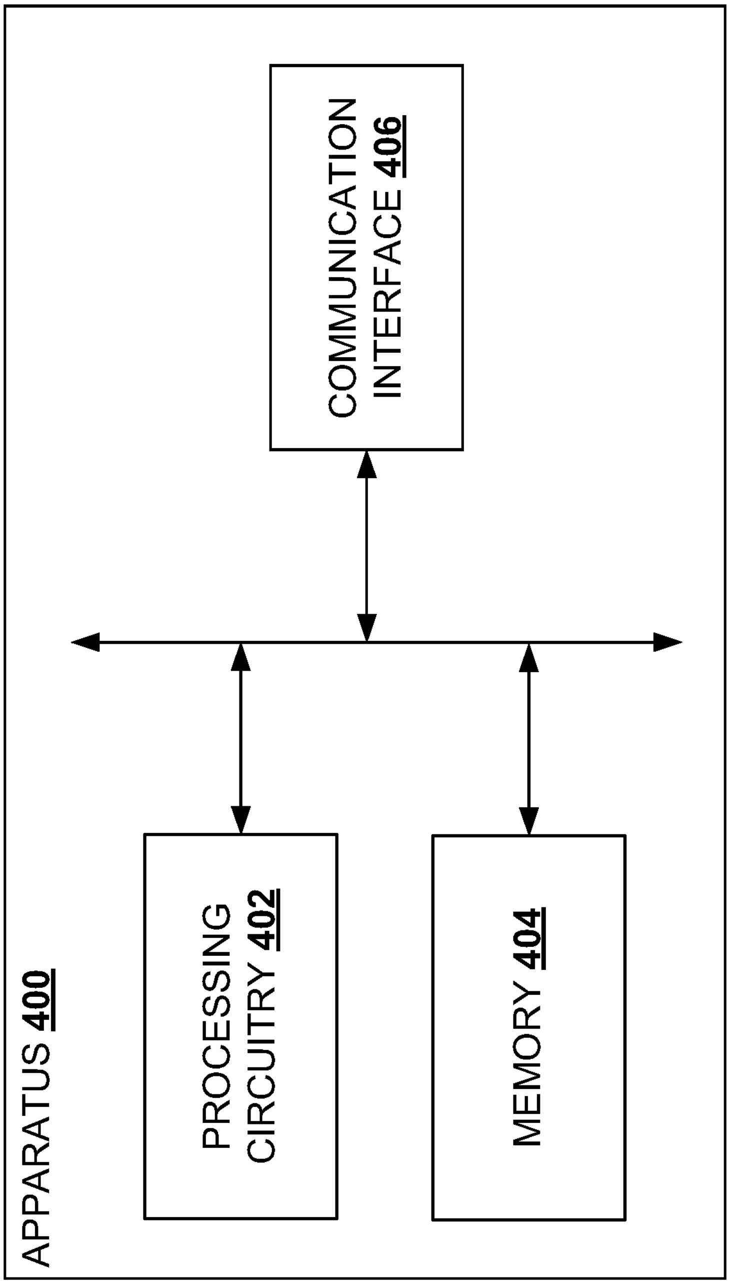
Figure 5:
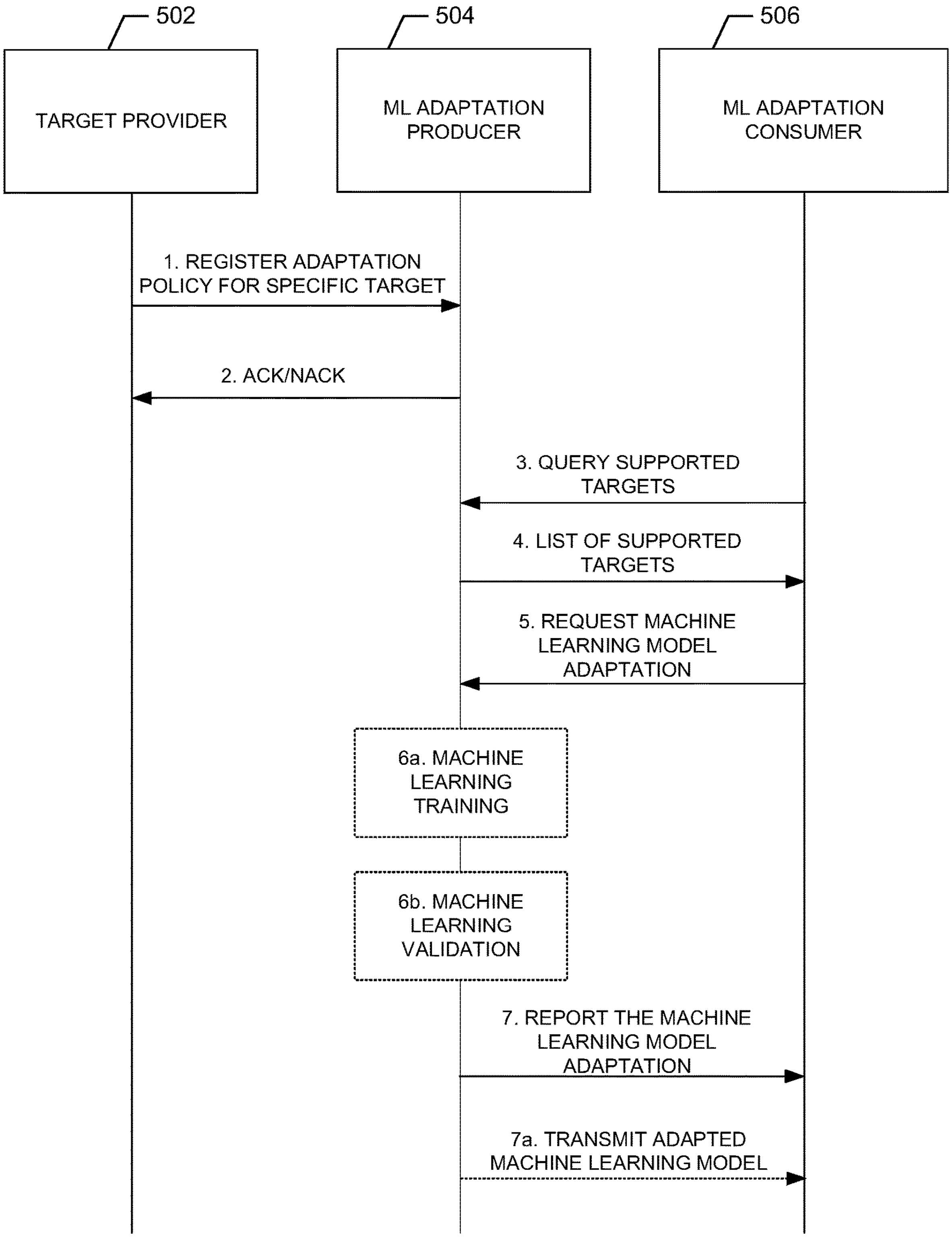
Figure 6:
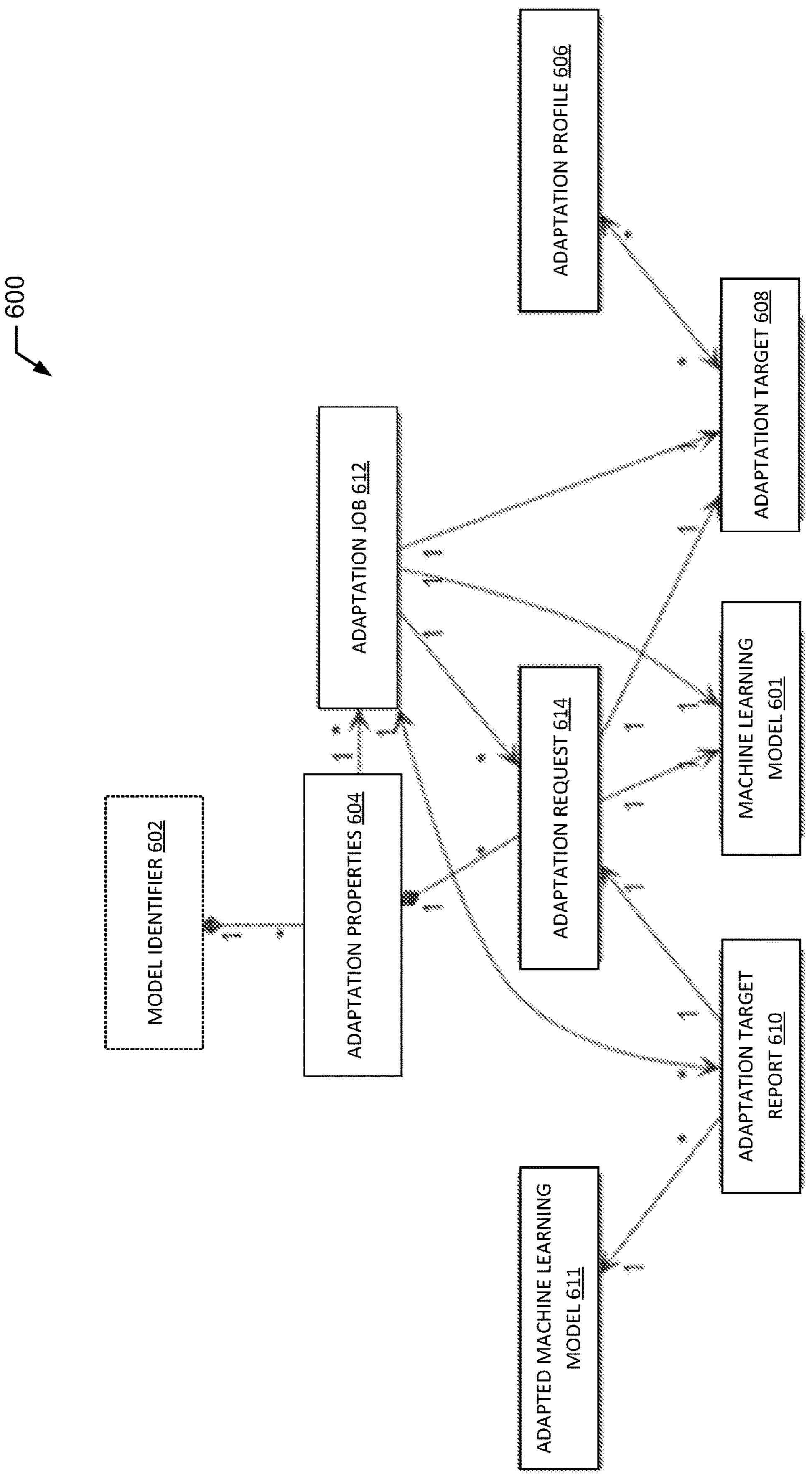
Figure 7:
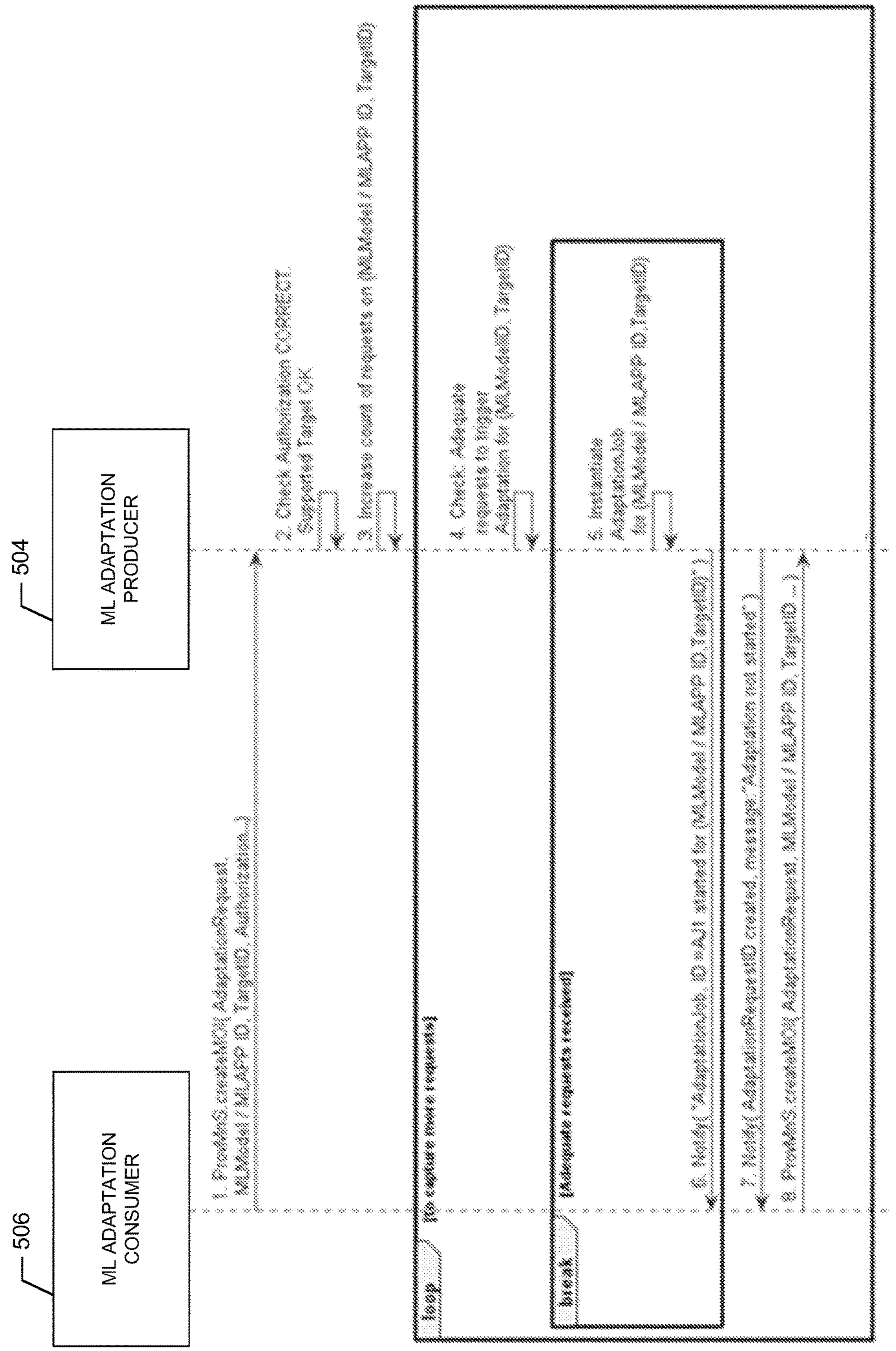
Figure 8:
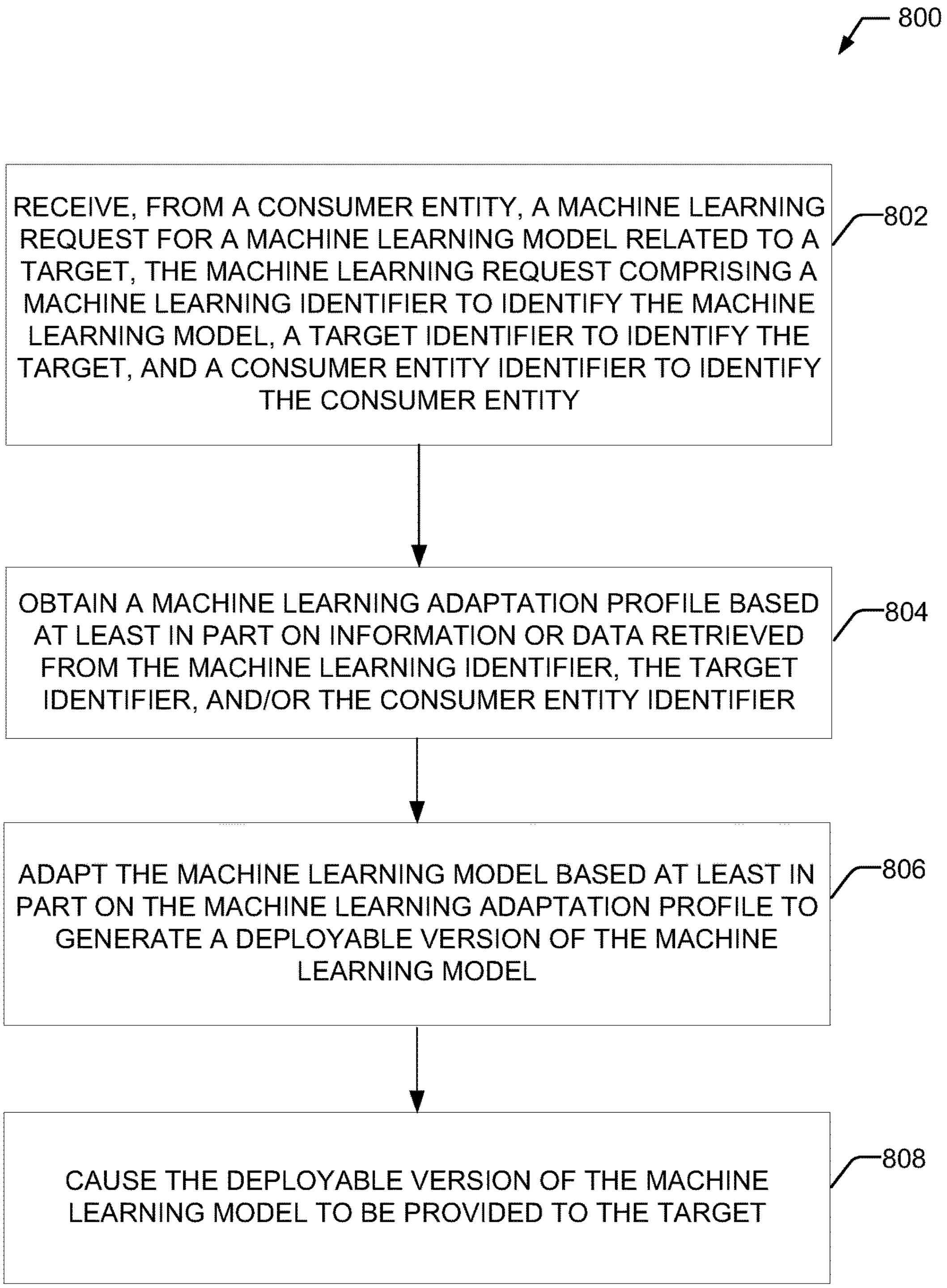

Having thus described certain example embodiments of the invention in general terms, reference will now be made to the accompanying drawings, which are not necessarily drawn to scale, and wherein:

FIG. 1 depicts an example architecture for a communications network in accordance with one or more example embodiments of the present disclosure;

FIG. 2 depicts another example architecture for a communications network in accordance with one or more example embodiments of the present disclosure;

FIG. 3 depicts yet another example architecture for a communications network in accordance with one or more example embodiments of the present disclosure;

FIG. 4 is a block diagram of an apparatus configured in accordance with one or more example embodiments of the present disclosure;

FIG. 5 illustrates example transmissions between a target provider, a machine learning (ML) adaptation producer, and a ML adaptation consumer in accordance with one or more example embodiments of the present disclosure;

FIG. 6 illustrates an example adaptation information model in accordance with one or more example embodiments of the present disclosure;

FIG. 7 illustrates example transmissions between a ML adaptation producer and a ML adaptation consumer in accordance with one or more example embodiments of the present disclosure; and FIG. 8 illustrates a flowchart illustrating other operations performed, such as by the apparatus of FIG. 4, in order to provide for machine learning model and/or machine learning application adaptation for a target in a communications network, in accordance with one or more example embodiments of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data." "content." "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As defined herein, a "computer-readable storage medium," which refers to a physical storage medium (e.g., volatile or non-volatile memory device), may be differentiated from a "computer-readable transmission medium," which refers to an electromagnetic signal.

Third generation partnership project (3GPP) $5^{th}$ generation (5G) technology is a next generation of radio systems and network architecture that can deliver extreme broadband and ultra-robust, low latency connectivity. 5G technology improves a variety of telecommunication services offered to the end users, and helps to support massive broadband that delivers gigabytes of bandwidth per second on demand for both the uplink and downlink transmissions. Next generation systems, which utilize the 5G architecture, utilize virtualized radio access network (RAN) functions and core network functions. Additionally, next generation systems which utilize the 5G architecture have been designed as a Service Based Architecture (SBA), e.g., a system architecture in which the system functionality is achieved by a set of Network Functions (NFs) providing services to other authorized NFs to access their services. The 5G network allows for the support of NFs via a Network Repository Function (NRF). For example, an NRF can maintain a list of available NFs to facilitate service registration and/or discovery in an instance in which a user equipment (UE) attempts to access one or more services provided by one or more network devices.

Certain embodiments will be illustrated herein in conjunction with example communication systems, frameworks, and/or associated techniques to provide a machine learning model and/or application adaptation for a target in a communications network. It should be understood, however, that the scope of the claims is not limited to particular types of communication systems and/or processes disclosed. An example embodiment can be implemented in a terminal device (e.g., a user equipment) or a network (e.g., a communication network) of a communication system, using alternative processes and operations. For example, although illustrated in the context of wireless cellular systems utilizing 3GPP system elements such as a 3GPP next generation core network, the disclosed embodiments can be adapted in a straightforward manner to a variety of other types of communication systems. Additionally, while the present disclosure may describe certain embodiments in conjunction with a 5G communications system, other embodiments also apply to and comprise other networks and network technologies, such as 3G, 4G, Long Term Evolution (LTE), 6G, etc. without limitation.

Some embodiments herein make specific reference to hypertext transfer protocol (HTTP), however, other embodiments contemplate that alternative protocols can be used. For example, some alternative protocols are hypertext transfer protocol secure (HTTPS), HTTP/2. HTTP/3, quick user datagram protocol internet connection (QUIC), software package data exchange (SPDY), Gopher protocol, file transfer protocol (FTP), secure file transfer protocol (SFTP), file transfer protocol with explicit SSL (FTPES), secure copy protocol (SCP), internet application protocol (IAP), and similarly known technologies understood by one skilled in the art in light of the present disclosure. An example embodiment further contemplates that the methods, apparatuses, and computer program products described herein can also be applicable for use with a variety of network standards and communication protocols including those that have been developed and those which have yet to be developed.

In accordance with illustrative embodiments implemented in a 5G communication system environment, one or more 3GPP standards, specifications, and/or protocols provide further explanation of user equipment and core network elements/entities/functions and/or operations performed by the user equipment and the core network elements/entities/functions. e.g., the 3GPP System Aspects (SA) Working Group 5 (3GPP SA5), the 3GPP RAN 3. Other 3GPP standards, specifications and/or protocols provide other conventional details that one of ordinary skill in the art will realize. However, while illustrative embodiments are well-suited for implementation associated with the above-mentioned 3GPP standards, alternative embodiments are not necessarily intended to be limited to any particular standards.

In a communication system at least a part of a communication session between at least two stations occurs over a wireless link. Examples of wireless systems comprise public land mobile networks (PLMN), satellite-based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or a user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

To facilitate a communication session, machine learning modeling services can be provided via a communication system. For example, a machine learning model and/or a machine learning application can be deployed (e.g., in a public land mobile network (PLMN) or wireless local area network (WLAN)) to provide one or more services for data consumers. However, machine learning modeling services can often be inefficient and/or may result in data consumers receiving an incorrect version of a machine learning model, among other deficiencies. In addition, transfer of certain machine learning models may not be possible via certain communication networks.

As such, described herein are methods, apparatuses, and computer program products for providing a machine learning model and/or a machine learning application adaptation for a target in a communications network to resolve some or all of the described limitations of current communication networks and/or current network protocols. In various embodiments, a deployable machine learning model and/or machine learning model application can be provided for a specific target based on a set of requirements for the specific target. For example, a network framework and/or management system can be configured to add, register, and/or remove one or more requirements for the specific target. The set of requirements can include machine learning model operations, machine learning application operations, machine learning model policies, and/or machine learning application policies for specific targets. The set of requirements can additionally or alternatively be related to hardware and/or software needs and capabilities of a target such as user equipment, a network element, a virtual network resource, a virtual network service, and/or another type of network target. Accordingly, any target (e.g., any network element or user equipment) that has a limited capability to handle a machine learning model or machine learning application may request an adaptation according to a given policy.

The set of requirements can also be utilized to adapt a machine learning model and/or a machine learning application. A network framework and/or management system can additionally or alternatively be configured to query available targets supported by and/or available in a communications network. A network framework and/or management system can additionally or alternatively be configured to request the adaptation of a given machine learning model and/or machine learning application to specific targets. A network framework and/or management system can additionally or alternatively be configured for authentication, authorization and/or access control for registering and querying target operations. To provide machine learning model and/or machine learning application adaptation as disclosed herein, a network framework can employ a machine learning adaptation function with associated application programming interfaces to enable management and execution of operations for creating a deployable machine learning model for a specific target with specific requirements.

In various embodiments, a machine learning model and/or a machine learning application to be adapted for a target can related to an application server and/or an application function. Additionally or alternatively, a machine learning model and/or a machine learning application to be adapted for a target can be related to NF service producer (NFp). The NFp can be Machine Learning Adaptation Function (MLAF) such as, for example, an MLAF logical function. However, it is to be appreciated that the one or more machine learning models can additionally or alternatively be configured for one or more other purposes associated with a communication system.

By providing machine learning model and/or a machine learning application adaptation for a target in a communications network, it is possible to improve performance of the communications network. For example, by providing machine learning model and/or a machine learning application adaptation for a target in a communications network, it is possible to minimize signaling load and/or reduce bandwidth being dedicated to such signaling, machine learning model employment, machine learning application employment, and/or other such activities.

FIGS. 1-3 illustrate various example architectures for a communications network 100 in which the various methods, apparatuses, and computer program products can be carried out and/or used. In some embodiments, the communications network 100 can comprise any suitable configuration, number, orientation, positioning, and/or dimensions of components and specialized equipment configured to provide an air interface (e.g., New Radio (NR)) for communication or connection between a User Equipment (UE) 102 and a Data Network (DN) 116 via a Core Network (CN) 101 of the communications network 100. The UE 102 can be associated with one or more devices associated with one or more NF service consumers. As illustrated in FIG. 1, a communications network 100 can be provided in which the UE 102 is in operable communication with the Radio Access Network (RAN) 104, such as by way of a transmission tower, a base station, an access point, a network node, and/or the like. In some embodiments, the RAN 104 can communicate with the CN 101 or a component or entity thereof. In some embodiments, the CN 101 can facilitate communication between the UE 102 and the DN 116, such as for sending data, messages, requests, and/or the like. In some embodiments, the DN 116 or the CN 101 can be in communication with an Application Server (AS) or Application Function (AF) 112. The RAN 104, CN 101, DN 116, and/or AS/AF 112 can be associated with a Network Repository Function (NRF), Network Function (NF) service producer, Secure Copy Protocol (SCP), Security Edge Protection Proxy (SEPP), Policy Charging Function (PCF), the like, or any combination thereof.

In some embodiments, the core network 101 of the communications network 100 may include one or more of the following network functions (NF); Authentication Server Function (AUSF), Access and Mobility Management Function (AMF), Data Network (DN), e.g. operator services, Internet access or 3rd party services, Unstructured Data Storage Function (UDSF), Network Exposure Function (NEF), Network Repository Function (NRF), Network Slice Selection Function (NSSF), PCF, Session Management Function (SMF), Unified Data Management (UDM), Unified Data Repository (UDR), User Plane Function (UPF), UE radio Capability Management Function (UCMF), Application Function (AF), User Equipment (UE), Next Generation-Radio Access Network (NG-RAN), 5G-Equipment Identity Register (5G-EIR), Network Data Analytics Function (NWDAF), and Charging Function (CHF). The system environment may further comprise the following network entities: Service Communication Proxy (SCP) and Security Edge Protection Proxy (SEPP).

In the context of a 5G network, such as illustrated in FIGS. 2 and 3, the communications network 100 can comprise a series of connected network devices and specialized hardware that is distributed throughout a service region, state, province, city, or country, and one or more network entities, which can be stored at and/or hosted by one or more of the connected network devices or specialized hardware. In some embodiments, the UE 102 can connect to the RAN 104, which can then relay the communications between the UE 102 and the CN 101, the CN 101 being connected to the DN 116, which can be in communication with one or more AS/AF 112. In some embodiments, the UE 102 can be in communication with a RAN 104, which can act as a relay between the UE 102 and other components or services of the CN 101. For instance, in some embodiments, the UE 102 can communicate with the RAN 104, which can in turn communicate with an Access and Mobility Management Function (AMF) 108. In other embodiments, the UE 102 can communicate directly with the AMF 108. In some embodiments, the AMF 108 can be in communication with one or more network functions (NFs), such as an Machine Learning Adaptation Function (MLAF) 119, an Authentication Server Function (AUSF) 120, a Network Slice Selection Function (NSSF) 122, a Network Repository Function (NRF) 124, a Policy Charging Function (PCF) 114, a Network Data Analytics Function (NWDAF) 126, a Unified Data Management (UDM) 118, the AS/AF 112, a Session Management Function (SMF) 110, and/or the like.

In some embodiments, the SMF 110 can be in communication with one or more User Plane Functions 106 (UPF 106, UPF 106*a*, UPF 106*b*, collectively "UPF 106"). By way of example only, in some embodiments, the UPF 106 can be in communication with the RAN 104 and the DN 116. In other embodiments, the DN 116 can be in communication with a first UPF 106*a* and the RAN 104 can be in communication with a second UPF 106*b*, while the SMF 110 is in communication with both the first and second UPFs 106*a, b* and the first and second UPFs 106*a, b* are in communication each with the other.

In some embodiments, the UE 102 can comprise a single-mode or a dual-mode device such that the UE 102 can be connected to one or more RANs 104. In some embodiments, the RAN 104 can be configured to implement one or more Radio Access Technologies (RATs), such as Bluetooth, Wi-Fi, and Global System for Mobile Communications (GSM), Universal Mobile Telecommunications Service (UMTS), LTE or 5G NR, among others, that can be used to connect the UE 102 to the CN 101. In some embodiments, the RAN 104 can comprise or be implemented using a chip, such as a silicon chip, in the UE 102 that can be paired with or otherwise recognized by a similar chip in the CN 101, such that the RAN 104 can establish a connection or line of communication between the UE 102 and the CN 101 by identifying and pairing the chip within the UE 102 with the chip within the CN 101. In some embodiments, the RAN 104 can implement one or more base stations, towers or the like to communicate between the UE 102 and the AMF 108 of the CN 101.

In some embodiments, the communications network 100 or components thereof (e.g., base stations, towers, etc.) can be configured to communicate with a communication device (e.g., the UE 102) such as a cell phone or the like over multiple different frequency bands. e.g., FR1 (below 6 GHZ), FR2 (mm Wave), other suitable frequency bands, sub-bands thereof, and/or the like. In some embodiments, the communications network 100 can comprise or employ massive Multiple Input and Multiple Output (massive MIMO) antennas. In some embodiments, the communications network 100 can comprise multi-user MIMO (MU-MIMO) antennas. In some embodiments, the communications network 100 can employ edge computing whereby the computing servers are communicatively, physically, computationally, and/or temporally closer to the communications device (e.g., UE 102) in order to reduce latency and data traffic congestion. In some embodiments, the communications network 100 can employ other technologies, devices, or techniques, such as small cell, low-powered RAN, beamforming of radio waves, WIFI-cellular convergence. Non-Orthogonal Multiple Access (NOMA), channel coding, and the like.

As illustrated in FIG. 3, the UE 102 can be configured to communicate with the RAN 104 in a N1 interface. e.g., according to a non-access stratum (NAS) protocol. In some embodiments, RAN 104 can be configured to communicate with the CN 101 or a component thereof (e.g., the AMF 108) in a N2 interface, e.g., in a control plane between a base station of the RAN 104 and the AMF 108. In some embodiments, the RAN 104 can be configured to communicate with the UPF 106 in a N3 interface, e.g., in a user plane. In some embodiments, the AMF 108 and/or the SMF 110 can be configured to communicate with other services or network entities within the CN 101 in various different interfaces and/or according to various different protocols. For instance, in some embodiments, the AMF 108 and/or the SMF 110 can be configured to communicate with the MLAF 119 in a Nmlaf interface. In some embodiments, the AMF 108 and/or the SMF 110 can be configured to communicate with the AUSF 120 in a Nausf interface or an N12 interface. In some embodiments, the AMF 108 and/or the SMF 110 can be configured to communicate with the NSSF 122 in an Nnssf interface. In some embodiments, the AMF 108 and/or the SMF 110 can be configured to communicate with the NRF 124 in a Nnrf interface. In some embodiments, the AMF 108 and/or the SMF 110 can be configured to communicate with the PCF 114 in a Npcf interface or an N7 interface. In some embodiments, the AMF 108 and/or the SMF 110 can be configured to communicate with the NWDAF 126 in a Nnwdaf interface. In some embodiments, the AMF 108 and/or the SMF 110 can be configured to communicate with the UDM 118 in a Nudm interface, an N8 interface, or an N10 interface. In some embodiments, the AMF 108 and/or the SMF 110 can be configured to communicate with the AS/AF 112 in a Naf interface. In some embodiments, the SMF 110 can be configured to communicate with the UPF 106 in a N4 interface, which can act as a bridge between the control plane and the user plane, such as acting as a conduit for a Protocol Data Unit (PDU) session during which information is transmitted between, e.g., the UE 102 and the CN 101 or components/services thereof.

It will be appreciated that certain example embodiments described herein arise in the context of a telecommunications network, including but not limited to a telecommunications network that conforms to and/or otherwise incorporates aspects of a 5th generation (5G) architecture. While FIGS. 1-3 illustrate various configurations and/or components of an example architecture of the communications network 100, many other systems, system configurations, networks, network entities, and pathways/protocols for communication therein are contemplated and considered within the scope of this present disclosure.

While the methods, devices/apparatuses, and computer program products/codes described herein are described within the context of a 5th generation core network (5GC) and system, such as illustrated in FIGS. 1-3 and described hereinabove, the described methods, devices, and computer program products can nevertheless be applied in a broader context within any suitable telecommunications system, network, standard, and/or protocol. It will be appreciated that the described methods, devices, and computer program products can further be applied to yet undeveloped future networks and systems as would be apparent to one skilled in the art in light of the present disclosure.

In this regard, the implementation, allocation, and/or adaptation of a machine learning model and/or machine learning application within the communications network 100 can be accomplished by an apparatus 400 as depicted in FIG. 4. The apparatus 400 may be embodied by and/or incorporated into one or more network elements, or any of the other devices discussed with respect to FIG. 1, such as core network (CN) 101, RAN 104, AMF 108, and/or devices that may be incorporated or otherwise associated with communications network 100. Alternatively, the apparatus 400 may be embodied by another device, external to such devices. For example, the apparatus may be embodied by one or more UEs, such as user equipment 102, a computing device, such as a personal computer, a computer workstation, a server or the like. In certain embodiments, a UE may be a mobile computing device, such as a mobile terminal, including but not limited to a smartphone, a tablet computer, or the like, for example.

Regardless of the manner in which the apparatus 400 is embodied, the apparatus 400 of an example embodiment is configured to include or otherwise be in communication with a processing circuitry 402 and a memory 404. In some embodiments, the apparatus 400 is configured to additionally include or otherwise be in communication with a communication interface 406. In some embodiments, the processing circuitry 402 may be in communication with the memory 404 via a bus for passing information among components of the apparatus 400. The memory 404 may be non-transitory and may include, for example, one or more volatile and/or non-volatile memories. In other words, for example, the memory 404 may be an electronic storage device (e.g., a computer readable storage medium) comprising gates configured to store data (e.g., bits) that may be retrievable by a machine (e.g., a computing device like the processing circuitry 402). The memory 404 may be configured to store information, data, content, applications, instructions, or the like for enabling the apparatus 400 to carry out various functions in accordance with an example embodiment of the present disclosure. For example, the memory 404 could be configured to buffer input data for processing by the processing circuitry 402. Additionally or alternatively, the memory 404 could be configured to store instructions for execution by the processing circuitry 402.

As described above, the apparatus 400 may be embodied by a computing device. However, in some embodiments, the apparatus 400 may be embodied as a chip or chip set. In other words, the apparatus 400 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 400 may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 402 may be embodied in a number of different ways. For example, the processing circuitry 402 may be embodied as one or more of various hardware processing means including a processor, such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry 402 may include one or more processing cores configured to perform independently. A multi-core processor may enable multiprocessing within a single physical package. Additionally or alternatively, the processing circuitry 402 may include one or more processors configured in tandem via the bus to enable independent execution of instructions, pipelining and/or multithreading.

In an example embodiment, the processing circuitry 402 may be configured to execute instructions stored in the memory 404 or otherwise accessible to the processing circuitry 402. Alternatively or additionally, the processing circuitry 402 may be configured to execute hard coded functionality. As such, whether configured by hardware or software methods, or by a combination thereof, the processing circuitry 402 may represent an entity (e.g., physically embodied in circuitry) capable of performing operations according to an embodiment of the present disclosure while configured accordingly. Thus, for example, when the processing circuitry 402 is embodied as an ASIC, FPGA or the like, the processing circuitry 402 may be specifically configured hardware for conducting the operations described herein. Alternatively, as another example, when the processing circuitry 402 is embodied as an executor of software instructions, the instructions may specifically configure the processing circuitry 402 to perform the algorithms and/or operations described herein when the instructions are executed. However, in some cases, the processing circuitry 402 may be a processor of a specific device (e.g., a pass-through display or a mobile terminal) configured to employ an embodiment of the present disclosure by further configuration of the processing circuitry 402 by instructions for performing the algorithms and/or operations described herein. The processing circuitry 402 may include, among other things, a clock, an arithmetic logic unit (ALU) and logic gates configured to support operation of the processing circuitry 402.

The apparatus 400 may optionally include the communication interface 406. The communication interface 406 may be any means such as a device or circuitry embodied in either hardware or a combination of hardware and software that is configured to receive and/or transmit data from/to a network and/or any other device or module in communication with the apparatus. In this regard, the communication interface 406 may include, for example, an antenna (or multiple antennas) and supporting hardware and/or software for enabling communications with a wireless communication network. Additionally or alternatively, the communication interface 406 may include the circuitry for interacting with the antenna(s) to cause transmission of signals via the antenna(s) or to handle receipt of signals received via the antenna(s). In some environments, the communication interface 406 may alternatively or also support wired communication. As such, for example, the communication interface 406 may include a communication modem and/or other hardware/software for supporting communication via cable, digital subscriber line (DSL), universal serial bus (USB) or other mechanisms.

Provided hereinbelow, are example transmissions between one or more network entities or network functions (e.g., one or more network devices, one or more network components, etc.) related to communications network 100 such as, for example, a network function service consumer (NFc), a network service producer (NFp), an MLAF, an NRF, a RAN, a CN, an AMF, an AS, an AF, and/or an NF vendor. The below example transmissions provide the foreseen functions or messaging needed.

In some embodiments, one or more network entities or network functions of a core network can be configured to store one or more machine learning models and/or machine learning applications related to network machine learning in a data repository of communications network 100.

FIG. 5 illustrates example transmissions between a target provider 502, a machine learning (ML) adaptation producer 504, and a ML adaptation consumer 506 of a communications network to provide machine learning model and/or machine learning application adaptation for a target in the communications network, according to one or more embodiments. The target provider 502 can be, for example, a vendor such as a device or system related to manufacturer of a user equipment (e.g., the UE 102). The ML adaptation producer 504 can be an NFp such as, for example, the MLAF 119. The ML adaptation consumer 506 can be an NFc such as, for example, one or more NF service consumers related to a user equipment (e.g., the UE 102).

In one or more embodiments, the target provider 502 can register an adaptation policy for a specific target, at 1. For example, the target provider 502 can provide a registration request for an adaptation policy to the ML adaptation producer 504. The specific target can be, for example, user equipment (e.g., the UE 102), a far-edge device, a UE terminal, an IoT device, a drone, network equipment, a base transceiver station, a network node, a gNodeB (gNB), hardware, a central processing unit, a network core (e.g., a 5G core), a model compiler for a hardware accelerator, or another type of target. The adaptation policy can be an adaptation policy for one or more machine learning models and/or one or more machine learning applications. Additionally, the adaptation policy can include one or more adaptation policies. In various embodiments, the target provider 502 can provide one or more target identifiers that identifies the specific target via the registration of the adaptation policy. In response to the registration request, the ML adaptation producer 504 can determine whether the target provider 502 is authorized for the registration procedure for the adaptation policy. In certain embodiments, the target provider 502 can provide one or more adaptation profiles (e.g., one or more machine learning adaptation profiles) associated with the adaptation policy to the ML adaptation producer 504.

In one or more embodiments, the ML adaptation producer 504 can send an acknowledgment (ACK) or a negative acknowledgment (NACK), at 2. The ML adaptation producer 504 can send an ACK or a NACK to the target provider 502 based on whether or not the target provider 502 is authorized for the registration procedure for the adaptation policy. For example, in response to a determination that the target provider 502 is authorized for the registration procedure for the adaptation policy, the ML adaptation producer 504 can send an ACK to the target provider 502. Alternatively, in response to a determination that the target provider 502 is not authorized for the registration procedure for the adaptation policy, the ML adaptation producer 504 can send a NACK to the target provider 502. The ACK can notify the target provider 502 of an acceptance of the registration procedure for the adaptation policy (e.g., that the target provider 502 is authorized to request the registration procedure). The NACK can notify the target provider 502 of a denial of the registration procedure for the adaptation policy (e.g., that the target provider 502 is not authorized to request the registration procedure). In response to a determination that the target provider 502 is authorized for the registration procedure for the adaptation policy, the ML adaptation producer 504 can store the one or more target identifiers and/or the related adaptation policy to be applied for the specific target.

In one or more embodiments, the ML adaptation consumer 506 can query supported targets, at 3. For example, the ML adaptation consumer 506 can query the ML adaptation producer 504 to obtain a list of supported targets. The list of supported targets can be generated based at least in part on one or more registration procedures for one or more adaptation policies related to one or more supported targets. Additionally, the list of supported targets can include respective target identifiers for respective targets authorized via one or more registration procedures for one or more adaptation policies. In an example, the list of supported targets can include the target identifier provided in the registration request by the target provider 502 at 1. In one or more embodiments, the query can include an identifier for a type of target to retrieve a subset of supported targets from the list of supported targets that correspond to the type of target. The list of supported targets can be utilized by the ML adaptation consumer 506 to subsequently request a machine learning model adaptation and/or a machine learning application adaptation for one or more supported targets from the list of supported targets.

In one or more embodiments, the ML adaptation producer 504 can provide the list of supported targets to the ML adaptation consumer 506, at 4. For instance, the ML adaptation producer 504 can determine whether access rights associated with the ML adaptation consumer 506 are valid and can provide the list of supported targets based on the access rights such that the ML adaptation consumer 506 is provided with authorized supported targets via the list of supported targets. In an example, if the ML adaptation consumer 506 resides in the core network 101, the list of supported targets can include one or more targets related to the core network 101.

In one or more embodiments, the ML adaptation consumer 506 can request a machine learning model adaptation, at 5. Additionally or alternatively, the ML adaptation consumer 506 can request a machine learning application adaptation. The request can be a request of a deployable machine learning model and/or machine learning application for a specific target with specific execution requirements. For example, when a machine learning model and/or machine learning application is to be utilized on a specific target, the ML adaptation consumer 506 can request the machine learning model adaptation and/or the machine learning application adaptation for the specific target. The machine learning model adaptation and/or the machine learning application adaptation can be in a format adapted to the specific target. In one or more embodiments, the request provided by the ML adaptation consumer 506 can include a model identifier for the machine learning model, an application identifier for the machine learning application, and/or a target identifier for the specific target. In one or more embodiments, the target identifier can correspond to the target identifier retrieved via the list of supported targets.

Based on the request, the ML adaptation producer 504 can perform adaptation of the machine learning model and/or the machine learning application. For example, the ML adaptation producer 504 can perform machine learning training, at 6a, based on the request. Additionally or alternatively, the ML adaptation producer 504 can perform machine learning validation, at 6b, based on the request. The machine learning training at 6a can include retraining of the machine learning model associated with the model identifier. For example, the ML adaptation producer 504 can perform quantization-aware training of the machine learning model to adapt the machine learning model for the specified target. The machine learning validation at 6b can include validation of the machine learning model associated with the model identifier and/or the machine learning application associated with the application identifier. For example, the ML adaptation producer 504 can validate the machine learning model based on an adaptation profile (e.g., a machine learning adaptation profile) for the machine learning model to adapt the machine learning model for the specified target. Additionally or alternatively, the ML adaptation producer 504 can validate the machine learning application based on an adaptation profile for the machine learning application to adapt the machine learning application for the specified target. In one or more embodiments, the ML adaptation producer 504 can execute one or more adaptation operations as indicated by an adaptation policy associated with the target identifier for the specific target. In certain embodiments, an adaptation profile can include the adaptation policy. In one or more embodiments, the ML adaptation producer 504 can execute one or more adaptation operations as indicated by an adaptation policy after confirming authorization and/or access rights of the ML adaptation consumer 506.

In certain embodiments, the machine learning training and/or the machine learning validation can utilize one or more services provided by one or more other functions (e.g., one or more other network functions), one or more internal resources for the ML adaptation producer 504, etc. In certain embodiments, the ML adaptation producer 504 can autonomously chain adaptation steps to achieve the adaptation of the machine learning model and/or the machine learning application. For example, in a scenario for the specific target where a certain compiler is to be used, if the certain compiler requires as input a model quantized in a specific format (e.g., an integer 8 format), the ML adaptation producer 504 can autonomously determine to proceed to a certain quantization step prior to invoking the compiler.

In one or more embodiments, the ML adaptation producer 504 can report the machine learning model adaptation to the ML adaptation consumer 506, at 7. For example, the ML adaptation producer 504 can provide reporting for one or more adaptation operations performed with respect to the machine learning training and/or the machine learning validation. The ML adaptation producer 504 can report the machine learning model adaptation to the ML adaptation consumer 506 in response to successful completion of the machine learning training and/or the machine learning validation. Additionally or alternatively, the ML adaptation producer 504 can provide the adapted machine learning model and/or the adapted machine learning application to the ML adaptation consumer 506 and/or the target associated with the target identifier. For example, the ML adaptation producer 504 can transmit the adapted machine learning model to the ML adaptation consumer 506, at 7a. Additionally or alternatively, the ML adaptation producer 504 can additionally or alternatively transmit an identifier for the adapted machine learning model to the ML adaptation consumer 506. In certain embodiments, the ML adaptation producer 504 can provide an error message in response to a failed operation associated with the machine learning training and/or the machine learning validation.

In various embodiments, the ML adaptation producer 504 can employ an adaptation information model to adapt a machine learning model and/or a machine learning application. FIG. 6 illustrates an example adaptation information model 600 employed by the ML adaptation producer 504, according to one or more embodiments. In various embodiments, the adaptation information model 600 can be configured for a model identifier 602 related to a machine learning model 601. In one or more embodiments, the adaptation information model 600 can manage adaptation properties 604 for a machine learning application adaptation process for the machine learning model 601. For example, the adaptation properties 604 can represent properties of an adaptation for the machine learning model 601. The adaptation properties 604 can be contained in a subnetwork, a managed network function (e.g., the MLAF 119), or in a management function for the communications network 100. In various embodiments, the adaptation properties 604 can include adaptation profile identifiers for respective adaptation profiles for respective vendors. For example, the adaptation properties 604 can store an adaptation profile identifier for an adaptation profile 606. The adaptation profile 606 can be, for example, an adaptation profile for the target provider 502 that manages one or more adaptation policies for one or more targets. The adaptation properties 604 can additionally or alternatively include one or more target identifiers and/or related information for one or more supported targets that can be served by the ML adaptation producer 504 such as adaptation target 608. The adaptation properties 604 can additionally or alternatively include one or more report identifiers and/or related information for one or more adaptation target reports such as adaptation target report 610. The adaptation properties 604 can additionally or alternatively instantiate one or more adaptation jobs such as adaptation job 612 as requested by the ML adaptation consumer 506. Accordingly, the adaptation properties 604 can manage various attributes related to adaptation targets, adaptation reports, and/or vendor adaptation profile identifiers.

In one or more embodiments, the adaptation information model 600 can manage one or more adaptation requests such as adaptation request 614. The adaptation request 614 can be, for example, a machine learning adaptation request as provided by the ML adaptation consumer 506. For example, the adaptation request 614 can be provided by the ML adaptation consumer 506 in order to obtain an adapted version of the machine learning model 601 (e.g., adapted machine learning model 611) that matched hardware capabilities and/or software capabilities for a specific target. The adaptation request 614 can include a request identifier that is associated with the request submitted and/or a source identifier associated with the consumer (e.g., the ML adaptation consumer 506) requesting the adaptation. In one or more embodiments, the adaptation request 614 can provide an authorization that allows the consumer to use the adaptation capabilities provided by a specific vendor (e.g., provided in the adaptation profile 606) to ensure that authorized consumers as determined by the vendor may use the adaptation capabilities offered for the adaptation target 608.

In one or more embodiments, the adaptation request 614 can specify the adaptation target 608 for the adaptation and/or the associated adaptation profile 606 where the adaptation capability is provided. If the consumer is authorized to use the provided adaptation capability in the adaptation profile 606, the adaptation request 614 can be approved and fulfilled by the ML adaptation producer 504. Otherwise, the adaptation request 614 can be denied for lack of authorization. In certain embodiments, where the adaptation request 614 does not specify an adaptation profile, then a default vendor may be selected by the ML adaptation producer 504 or the ML adaptation producer 504 may utilize a default adaptation policy for the adaptation target 608. In one or more embodiments, the adaptation request 614 can specify the model identifier 602 for the machine learning model 601 to undergo adaptation. In one or more embodiments, the adaptation request 614 can specify an adaptation policy to be used in the adaptation. If not specified, the ML adaptation producer 504 can utilize a default value for the associated adaptation target 608.

In one or more embodiments, the adaptation job 612 can represent properties of an adaptation job. In various embodiments, the adaptation job 612 can be executed by the ML adaptation producer 504 in response to a determination that the adaptation request 614 includes a corresponding identifier for the adaptation target 608, the adaptation profile 606, and/or the machine learning model 601. Accordingly, the adaptation job 612 can be associated with one or more application requests. In various embodiments, the adaptation job 612 can be associated with an identifier for a machine learning model, an adaptation target and/or an adaptation profile that offers the adaptation capability to be used by the ML adaptation producer 504. In various embodiments, the adaptation job 612 can additionally or alternatively provide adaptation reports to the ML adaptation consumer 506 associated with adaptation requests mapped to the adaptation job. In various embodiments, the adaptation job 612 can perform adaptation of the machine learning model 601 according to a specific adaptation policy (e.g., an 8-bit conversion policy). After successful completion of the adaptation job 612, an identifier for the adapted machine learning model 611 associated with the adaptation job 612 can be reported to the ML adaptation consumer 506 via the adaptation target report 610. In one or more embodiments, the adaptation target report 610 can include information regarding a status and/or results of the adaptation job 612. The adaptation target report 610 can be associated with the adaptation request 614.

In one or more embodiments, the adaptation profile 606 can represent an adaptation profile (e.g., a machine learning adaptation profile) capable of being instantiated via an adaptation of the machine learning model 601. The adaptation profile 606 can include information regarding an adaptation capability to be employed by the ML adaptation producer 504 to adapt the machine learning model 601 to the adaptation target 608. In various embodiments, the adaptation profile 606 can include an identifier for adaptation profile 606, one or more identifiers and/or related information for one or more supported adaptation targets, information for one or more supported adaptation policies for the one or more supported adaptation targets, and/or information for one or more consumer authorizations.

In one or more embodiments, the adaptation target 608 can describe and/or provide information regarding hardware capabilities and/or software capabilities for a specific target. In various embodiments, the adaptation target 608 can include an identifier and/or information regarding a target. In various embodiments, the adaptation target 608 can include an identifier and/or information regarding a type of target (e.g., a type of UE, a model number, etc.) for a target. The adaptation target 608 can additionally be associated with one or more adaptation profiles to identify which adaptation profiles can be employed to adapt a machine learning model to satisfy one or more requirements of the adaptation target 608.

Provided hereinbelow, are other example transmissions between one or more network entities or network functions (e.g., one or more network devices, one or more network components, etc.) related to communications network 100 such as, for example, an NFc, an NFp, an MLAF, an NRF, a RAN, a CN, an AMF, an AS, an AF, and/or an NF vendor. The below example transmissions provide the foreseen functions or messaging needed.

In some embodiments, one or more network entities or network functions of a core network can be configured to store one or more machine learning models and/or machine learning applications related to network machine learning in a data repository of communications network 100.

FIG. 7 illustrates example transmissions between the ML adaptation producer 504 and the ML adaptation consumer 506 to provide machine learning model and/or machine learning application adaptation for a target in the communications network, according to one or more embodiments. In one or more embodiments, at step 1, the ML adaptation consumer 506 transmits a request for a machine learning model or machine learning application adaptation to the ML adaptation producer 504 by specifying a model identifier (e.g., MLModel ID) for the machine learning model or an application identifier (e.g., MLAPP ID) for the machine learning application for which the adaptation is requested. Additionally or alternatively, the request can specify a target identifier (e.g., Target ID) for a target in which the MLModel/MLAPP is to be adapted. Additionally or alternatively, the request provides authorization credentials for the ML adaptation consumer 506.

In one or more embodiments, at step 2, the ML adaptation producer 504 can determine whether the ML adaptation consumer 506 is authorized to perform the operation, whether the target identifier is supported, and/or whether there is any incompatibility between the MLModel/MLAPP and the requested target (e.g., whether an unsupported type of model or format exists).

In one or more embodiments, at step 3, the ML adaptation producer 504 can increase the count of pending requests for adaptation of the MLModel/MLAPP ID to the target identifier. The ML adaptation producer 504 can additionally or alternatively store time information (e.g., the date/time) of each pending request.

To improve operational efficiency, in one or more embodiments, at step 4, the ML adaptation producer 504 can initiate an adaptation job in response to a determination that there is a sufficient number of requests for adaptation of the MLModel/MLAPP ID to the target identifier. The ML adaptation producer 504 can additionally or alternatively initiate an adaptation job in response to a determination that a pending request is waiting. Alternatively, the ML adaptation producer 504 can determine to reject the pending requests in response to a determination that a minimal number of pending requests is not reached by a timing threshold value.

Once the conditions for starting the adaptation for the MLModel/MLAPP ID to the target identifier are satisfied, in one or more embodiments, at step 5, the ML adaptation producer 504 can initiate an adaptation job process to perform the adaptation of the machine learning model and/or the machine learning application.

In one or more embodiments, at step 6, the ML adaptation producer 504 can notify, for all ML adaptation consumers including the ML adaptation consumer 506 having a pending request for the specific adaptation between the MLModel/MLAPP ID and the target identifier, that the adaptation job has started. In various embodiments, the ML adaptation producer 504 can provides a job identifier related to the adaptation job to the respective ML adaptation consumers to allow a status and/or adaptation job results to be obtained via one or more application programming interface calls.

If a sufficient number of requests have not been processed, in one or more embodiments, at step 7, the ML adaptation producer 504 can notify, for all ML adaptation consumers including the ML adaptation consumer 506 having a pending request for the specific adaptation between the MLModel/MLAPP ID and the target identifier, that the adaptation job has not started yet. Additionally, the ML adaptation producer 504 can continue to wait for additional requests until a certain threshold amount is reached (or another condition such as a maximum waiting time is reached).

In one or more embodiments, at step 8, the ML adaptation consumer 506 can transmit one or more application programing interface calls to the ML adaptation producer 504 to obtain a status update for the adaptation job and/or to request a new machine learning model or machine learning application adaptation by specifying a model identifier (e.g., MLModel ID) for the machine learning model or an application identifier (e.g., MLAPP ID) for the machine learning application.

FIG. 8 illustrates a flowchart depicting a method 800 according to an example embodiment of the present disclosure. The operations of the method 800 are performed, such as by the apparatus 400 of FIG. 4, in order to provide for machine learning model and/or machine learning application adaptation for a target in a communications network, in accordance with one or more embodiments of the present disclosure. The apparatus 400 can be implemented, for example, by an ML adaptation producer (e.g., the ML adaptation producer 504) and/or another type of network entity. As shown in block 802 of FIG. 8, the apparatus 400 includes means, such as the processing circuitry 402, the communication interface 406, or the like, configured to receive, from a consumer entity, a machine learning request for a machine learning model related to a target, the machine learning request comprising a machine learning identifier to identify the machine learning model, a target identifier to identify the target, and a consumer entity identifier to identify the consumer entity.

As shown in block 804 of FIG. 8, the apparatus 400 also includes means, such as the processing circuitry 402, the communication interface 406, or the like, configured to obtain a machine learning adaptation profile based at least in part on information or data retrieved from the machine learning identifier, the target identifier, and/or the consumer entity identifier. For example, the apparatus 400 can include means, such as the processing circuitry 402, the communication interface 406, or the like, configured to obtain the machine learning adaptation profile based at least in part on a correlation between the machine learning identifier, the target identifier, and/or the consumer entity identifier. The correlation can map the machine learning identifier, the target identifier, and/or the consumer entity identifier to the machine learning adaptation profile. For example, the correlation can map the machine learning identifier, the target identifier, and/or the consumer entity identifier to the machine learning adaptation profile based on a list of targets.

As shown in block 806 of FIG. 8, the apparatus 400 also includes means, such as the processing circuitry 402, the communication interface 406, or the like, configured to adapt the machine learning model based at least in part on the machine learning adaptation profile to generate a deployable version of the machine learning model.

In one or more embodiments, the apparatus 400 can include means, such as the processing circuitry 402, the communication interface 406, or the like, configured to adapt the machine learning model by retraining the machine learning model based at least in part on the target identifier and the consumer entity identifier. In one or more embodiments, the apparatus 400 can include means, such as the processing circuitry 402, the communication interface 406, or the like, configured to additionally or alternatively adapt the machine learning model by validating the machine learning model based at least in part on the target identifier and the consumer entity identifier. In one or more embodiments, the apparatus 400 can include means, such as the processing circuitry 402, the communication interface 406, or the like, configured to additionally or alternatively adapt the machine learning model by adapting the machine learning model based at least in part on a set of hardware attributes associated with the target identifier, a set of software attributes associated with the target identifier, and/or a set of compiler policies for the target identifier. In one or more embodiments, the apparatus 400 can include means, such as the processing circuitry 402, the communication interface 406, or the like, configured to additionally or alternatively adapt the machine learning model by authorizing the deployable version of the machine learning model based on the consumer entity identifier.

As shown in block 808 of FIG. 8, the apparatus 400 also includes means, such as the processing circuitry 402, the communication interface 406, or the like, configured to cause the deployable version of the machine learning model to be provided to the target. In one or more embodiments, the apparatus 400 can also include means, such as the processing circuitry 402, the communication interface 406, or the like, configured to cause transmission of an acknowledgment message to the consumer entity in response to an acknowledgment of an execution of the deployable version of the machine learning model via the target.

In one or more embodiments, the apparatus 400 can include means, such as the processing circuitry 402, the communication interface 406, or the like, configured to configure the machine learning adaptation profile based at least in part on a registration request provided by a target provider.

In one or more embodiments, the apparatus 400 can include means, such as the processing circuitry 402, the communication interface 406, or the like, configured to receive the machine learning adaptation profile via a registration request provided by a target provider. Additionally, the apparatus 400 can include means, such as the processing circuitry 402, the communication interface 406, or the like, configured to adapt the machine learning model by adapting the machine learning model based at least in part on the machine learning adaptation profile provided by the target provider.

As described above, FIG. 8 is a flowchart of a method that can be carried out by, e.g., the apparatus 400, and/or according to a computer program product, according to example embodiments of the disclosure. A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as, e.g., in conjunction with the communications flowchart of FIG. 5 or FIG. 7, as part of the communications network 100 of FIGS. 1-3, and/or in conjunction with the adaptation information model 600 illustrated in FIG. 6. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

It will be understood that each block of the flowchart(s) and combination of blocks in the flowchart(s) can be implemented by various means, such as hardware, firmware, processor, circuitry, and/or other communication devices associated with execution of software including one or more computer program instructions. For example, one or more of the procedures described above can be embodied by computer program instructions. In this regard, the computer program instructions which embody the procedures described above can be stored, for example, by the memory 404 of the apparatus 400 employing an embodiment of the present disclosure and executed by the processing circuitry 402. As will be appreciated, any such computer program instructions can be loaded onto a computer or other programmable apparatus (for example, hardware) to produce a machine, such that the resulting computer or other programmable apparatus implements the functions specified in the blocks of the flowchart(s). These computer program instructions can also be stored in a computer-readable memory that can direct a computer or other programmable apparatus to function in a particular manner, such that the instructions stored in the computer-readable memory produce an article of manufacture the execution of which implements the function specified in the blocks of the flowchart(s). The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the blocks of the flowchart(s).

Accordingly, blocks of the flowchart(s) support combinations of means for performing the specified functions and combinations of operations for performing the specified functions for performing the specified functions. It will also be understood that one or more blocks of the flowchart(s), and combinations of blocks in the flowchart(s), can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The expression "at least one of A or B" in this document means A, or B, or both A and B.

What is claimed is:

1. A method, comprising:

receiving, from a consumer network entity of a communication network, a machine learning request for a machine learning model related to a target entity having one or more requirements, the target entity comprising a user equipment or a network entity of the communication network, the machine learning model to be deployed on the target entity to provide a service for the consumer network entity, the machine learning request comprising a machine learning identifier to identify the machine learning model, a target identifier to identify the target entity, and a consumer entity identifier to identify the consumer network entity;

obtaining a machine learning adaptation profile based at least in part on information or data retrieved from the machine learning identifier, the target identifier, and the consumer entity identifier, wherein the information or data includes the one or more requirements of the target entity;

adapting the machine learning model based at least in part on the machine learning adaptation profile to generate a deployable version of the machine learning model to satisfy the one or more requirements for the target entity, wherein the adapting the machine learning model comprises at least retraining the machine learning model based at least in part on the target identifier; and causing the deployable version of the machine learning model to be provided to the target entity.

2. The method of claim 1, wherein the machine learning model is retrained based at least in part on the consumer entity identifier.

3. The method of claim 1, wherein the adapting the machine learning model comprises validating the machine learning model based at least in part on the target identifier and the consumer entity identifier.

4. The method of claim 1, wherein the adapting the machine learning model comprises adapting the machine learning model based at least in part on a set of hardware attributes associated with the target identifier.

5. The method of claim 1, wherein the adapting the machine learning model comprises adapting the machine learning model based at least in part on a set of software attributes associated with the target identifier.

6. The method of claim 1, wherein the adapting the machine learning model comprises adapting the machine learning model based at least in part on a set of compiler policies for the target identifier.

7. The method of claim 1, wherein the adapting the machine learning model comprises authorizing the deployable version of the machine learning model based on the consumer entity identifier.

8. The method of claim 1, further comprising:

causing transmission of an acknowledgment message to the consumer network entity in response to an acknowledgment of an execution of the deployable version of the machine learning model via the target entity.

9. The method of claim 1, further comprising:

configuring the machine learning adaptation profile based at least in part on a registration request provided by a target provider.

10. The method of claim 1, further comprising:

receiving the machine learning adaptation profile via a registration request provided by a target provider.

11. The method of claim 10, wherein the adapting the machine learning model comprises adapting the machine learning model based at least in part on the machine learning adaptation profile provided by the target provider.

12. An apparatus comprising:

at least one processor; and at least one memory storing instructions that, when executed by the at least one processor, causes the apparatus at least to:

receive, from a consumer network entity of a communication network, a machine learning request for a machine learning model related to a target entity having one or more requirements, the target entity comprising a user equipment or a network entity of the communication network, the machine learning model to be deployed on the target entity to provide a service for the consumer network entity, the machine learning request comprising a machine learning identifier to identify the machine learning model, a target identifier to identify the target entity, and a consumer entity identifier to identify the consumer network entity;

obtain a machine learning adaptation profile based at least in part on information or data retrieved from the machine learning identifier, the target identifier, and the consumer entity identifier, wherein the information or data includes the one or more requirements of the target entity;

adapt the machine learning model based at least in part on the machine learning adaptation profile to generate a deployable version of the machine learning model to satisfy the one or more requirements for the target entity, wherein adapting the machine learning model comprises at least retraining the machine learning model based at least in part on the target identifier; and cause the deployable version of the machine learning model to be provided to the target entity.

13. The apparatus of claim 12, wherein the machine learning model is retrained based at least in part on the consumer entity identifier.

14. The apparatus of claim 12, wherein the instructions further cause, when executed by the at least one processor, the apparatus to:

validate the machine learning model based at least in part on the target identifier and the consumer entity identifier.

15. The apparatus of claim 12, wherein the instructions further cause, when executed by the at least one processor, the apparatus to:

adapt the machine learning model based at least in part on a set of hardware attributes associated with the target identifier.

16. The apparatus of claim 12, wherein the instructions further cause, when executed by the at least one processor, the apparatus to:

adapt the machine learning model based at least in part on a set of software attributes associated with the target identifier.

17. The apparatus of claim 12, wherein the instructions further cause, when executed by the at least one processor, the apparatus to:

adapt the machine learning model based at least in part on a set of compiler policies for the target identifier.

18. The apparatus of claim 12, wherein the instructions further cause, when executed by the at least one processor, the apparatus to:

configure the machine learning adaptation profile based at least in part on a registration request provided by a target provider.

19. The apparatus of claim 12, wherein the instructions further cause, when executed by the at least one processor, the apparatus to:

receive the machine learning adaptation profile via a registration request provided by a target provider, wherein the adapting the machine learning model comprises adapting the machine learning model based at least in part on the machine learning adaptation profile provided by the target provider.

20. A computer program product comprising at least one non-transitory computer-readable storage medium having computer-executable program code instructions stored therein, the computer-executable program code instructions comprising program code instructions to:

receive, from a consumer network entity of a communication network, a machine learning request for a machine learning model related to a target entity having one or more requirements, the target entity comprising a user equipment or a network entity of the communication network, the machine learning model to be deployed on the target entity to provide a service for the consumer network entity, the machine learning request comprising a machine learning identifier to identify the machine learning model, a target identifier to identify the target entity, and a consumer entity identifier to identify the consumer network entity;

obtain a machine learning adaptation profile based at least in part on information or data retrieved from the machine learning identifier, the target identifier, and the consumer entity identifier, wherein the information or data includes the one or more requirements of the target entity;

adapt the machine learning model based at least in part on the machine learning adaptation profile to generate a deployable version of the machine learning model to satisfy the one or more requirements for the target entity, wherein adapting the machine learning model comprises at least retraining the machine learning model based at least in part on the target identifier; and cause the deployable version of the machine learning model to be provided to the target entity.

* * * * *